United States Patent [19]

Aoki

[11] Patent Number: 5,424,486
[45] Date of Patent: Jun. 13, 1995

[54] MUSICAL KEY DETERMINING DEVICE

[75] Inventor: Eiichiro Aoki, Hamamatsu, Japan

[73] Assignee: Yamaha Corporation, Hamamatsu, Japan

[21] Appl. No.: 117,977

[22] Filed: Sep. 7, 1993

[30] Foreign Application Priority Data

Sep. 8, 1992 [JP] Japan .................................. 4-239285

[51] Int. Cl.6 ............................................. G01H 1/38
[52] U.S. Cl. ......................................... 84/613; 84/650; 84/DIG. 22
[58] Field of Search ................. 84/613, 609, 637, 669, 84/650, DIG. 22

[56] References Cited

U.S. PATENT DOCUMENTS

| | | | |
|---|---|---|---|
| 4,982,643 | 1/1991 | Minamitaka | 84/613 |
| 5,003,860 | 4/1991 | Minamitaka | 84/613 |
| 5,056,401 | 10/1991 | Yamaguchi et al. | |
| 5,088,380 | 2/1992 | Minamitaka | 84/637 |
| 5,218,153 | 6/1993 | Minamitaka | 84/613 |
| 5,221,802 | 6/1993 | Konishi et al. | 81/613 |

Primary Examiner—Stanley J. Witkowski
Attorney, Agent, or Firm—Spensley Horn Jubas & Lubitz

[57] ABSTRACT

Melody and chord information of a music piece are supplied. On the basis of the chord information, one or more possible musical keys are nominated. Then, on the basis of the melody information, it is judged in a collating manner whether it is proper to determine any of the possible musical keys as a musical key of the music piece. For instance, the possible musical keys are nominated on the basis of detection of a dominant motion, since the dominant motion in a chord progression strongly suggests specific musical keys. For instance, of the nominated possible musical keys, those which do not contain all of the melody notes as their scale note are excluded, and a single musical key which contains all of the melody notes as its scale note is determined as the musical key of the music piece. With such arrangements, it is allowed to make a musical key determination which is very reasonable from a musical point of view.

18 Claims, 3 Drawing Sheets

MUSICAL KEY DETERMINING DEVICE

BACKGROUND OF THE INVENTION

This invention relates to a musical key determining device which determines a musical key of a music piece on the basis of chord and melody data of the piece.

For application in automatic accompaniment and arrangement of a music piece, various devices are proposed which serve to determine a key of the music piece on the basis of actually performed contents (automatic performance data). For example, U.S. Pat. No. 5,056,401 discloses such a device that determines a key of a music piece on the basis of detection of a specific chord progression. But, the disclosed musical key determining device requires a very complex structure, since it determines a key by covering or tracing a very complicated progression of chords. In addition, because the same kind of chord progression is used for various different keys, it is not always possible to determine a specific key only by tracing a chord progression. In such a case, a specific key determined from among various different keys, very often, tends to be incorrect, and therefore the determined key can not be used for automatic accompaniment and/or automatic arrangement. Besides, in some cases, such a key is determined which corresponds to the chord progression but not to the melody.

SUMMARY OF THE INVENTION

It is therefore an object of the present invention to provide a musical key determining device which is capable of making an accurate key determination with a relatively simple construction.

In order to achieve the above-mentioned object, a musical key determining device in accordance with the present invention comprises a performance information supplying section for supplying melody information and chord information of a music piece, a possible musical key nomination section for nominating one or more possible musical keys on the basis of the chord information supplied by the performance information supplying section, and a judging section for judging, on the basis of the melody information supplied by the performance information supplying section, whether or not it is proper to determine any of the possible musical keys as a musical key of the music piece.

First, on the basis of the chord information, one or more possible musical keys are nominated. Then, on the basis of the melody information, it is judged whether it is proper to determine any of the possible musical keys as a musical key of the music piece. For example, since melody notes are generally composed of scale notes, those possible musical keys which do not contain all of the melody notes as their scale notes are excluded, and a single musical key which contains all of the melody notes as its scale notes is determined as the musical key of the music piece. This allows a musical key determination which is very reasonable from a musical point of view. Therefore, because a key is determined on the basis of both chord and melody, it is possible to greatly improve the accuracy of key determination. Besides, even if the possible key nomination on the basis of the chord is made relatively simple, the subsequent additional determination based on the melody can secure a desired accuracy, and thus it may not be necessary to perform a particular analysis of a complicated chord progression. Therefore, as a whole, it is possible to realize a much simpler structure. For example, because the "dominant motion" in the chord progression strongly suggests specific keys, it is allowed to make a proper musical key determination with a simplified construction, by nominating the possible keys on the basis of detection of such a dominant motion and by verifying whether or not the nominated possible keys are proper on the basis of the melody notes.

Now, the preferred embodiment of the present invention will be described in greater detail with reference to the accompanying drawings.

DETAILED DESCRIPTION OF THE PREFERRED EMBODIMENT

Figure 1:
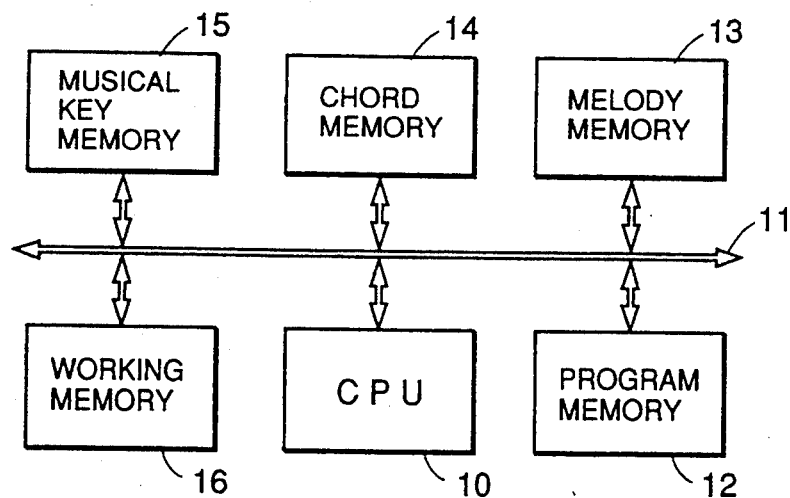
FIG. 1 is a block diagram illustrating an embodiment of a musical key determining device in accordance with the present invention.

FIG. 1 is a block diagram illustrating an embodiment of a musical key determining device in accordance with the present invention. This musical key determining device, which is adapted for being incorporated into an automatic performance device or an automatic arrangement device, has a function of determining a key of a music piece on the basis of automatic performance data of the music piece. Although not described here in detail, once a musical key has been determined, control is made of automatic accompaniment, automatic arrangement etc.

To a central processing unit (CPU) 10 are connected, via a bus 11, a program memory 12, a melody memory 13, a chord memory 14, a key memory 15 and a working memory 16. The program memory 12 has a program stored therein which will be described later using flowcharts. In the melody memory 13 and chord memory 14, there are stored automatic performance data which comprise melody data and chord data. The musical key memory 15 stores data indicative of a key determined on the basis of the automatic performance data.

Figures 2A, 2B, 2C:
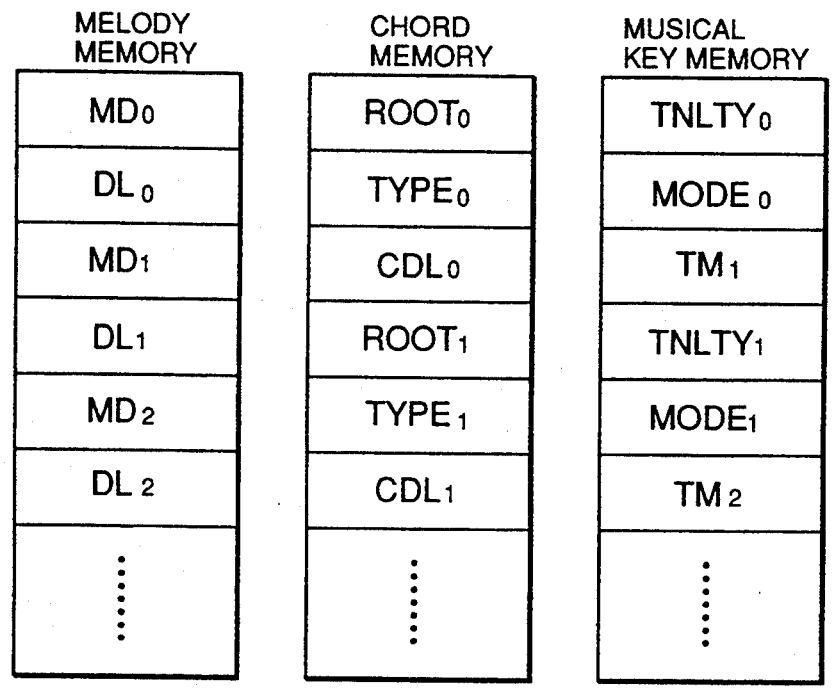
FIG. 2A is a diagram illustrating a memory format in a melody memory shown in FIG. 1.
FIG. 2B is a diagram illustrating a memory format in a chord memory shown in FIG. 1.
FIG. 2C is a diagram illustrating a memory format in a musical key memory shown in FIG. 1.

FIGS. 2A through 2C illustrate memory formats in the memory 13, chord memory 14 and musical key memory 15, respectively. FIG. 2A illustrates the memory format in the melody memory 13. Each tone data of a melody (melody tone data) is composed of pitch data MDi and duration data DLi, and these melody tone data are sequentially stored in the melody memory 13 in the performance order of the melody. "i" is a suffix that represents the order in which the melody tone changes (melody tone change order). FIG. 2B illustrates the memory format in the chord memory 14. Each chord data is composed of root data Tn, chord type data TYPEn and chord duration data CDLn. "n" is a suffix that represents the order in which the chord changes (chord change order). Further, FIG. 2C illustrates the memory format in the musical key memory 15. This memory 15 stores key data indicative of keys having been determined on the basis of the automatic performance data, in the order in which the key changes. Each key data is composed of tonic data TNLYm, major/minor key data MODEm and key change timing data TMm. "m" is a suffix that represents the order in which the key changes (key change order).

Figure 3:
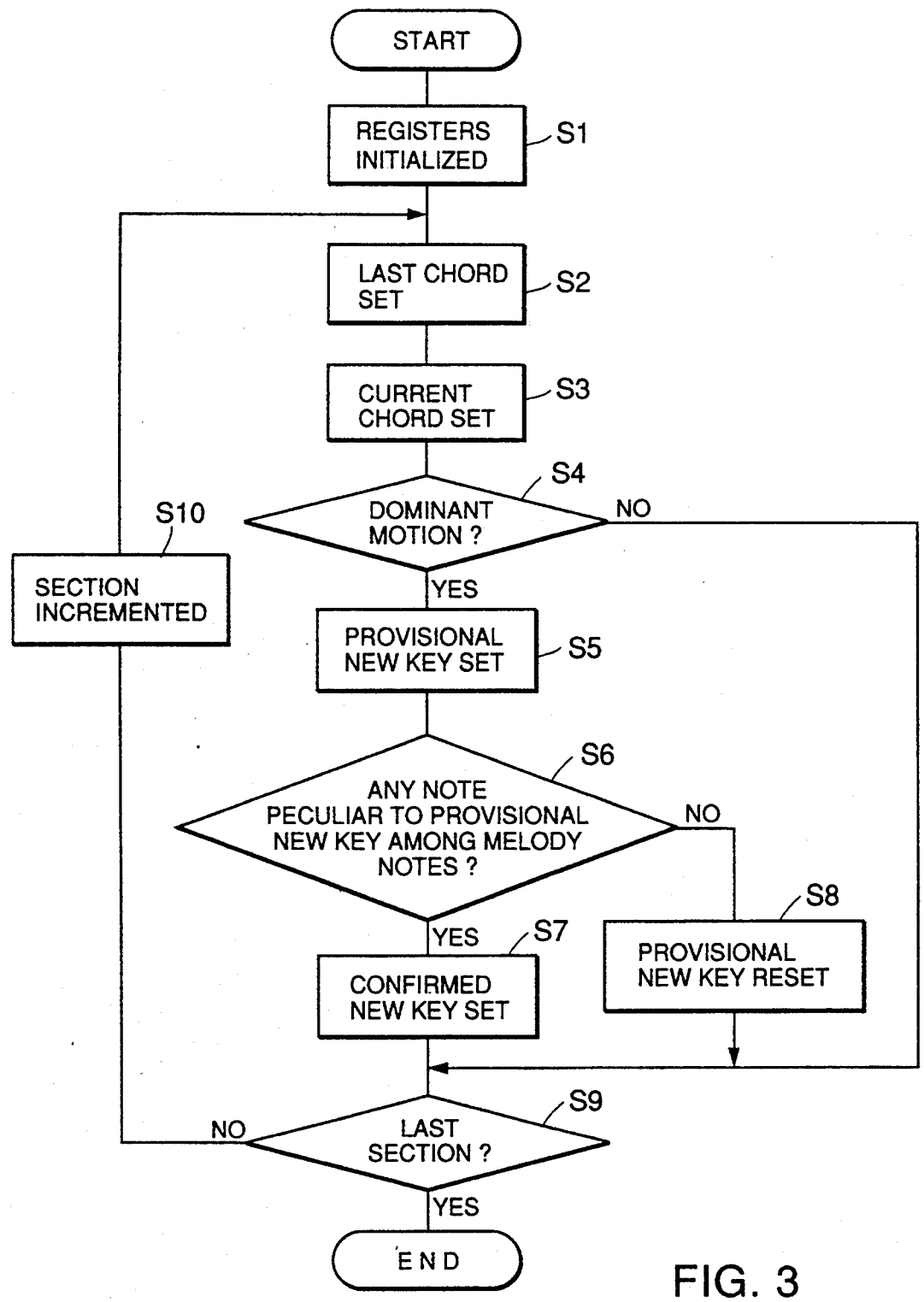
FIG. 3 is a flowchart illustrating an example of a key determining process performed in the embodiment of FIG. 1.

FIG. 3 is a flowchart illustrating the operation of the musical key determining device. In the illustrated example, a single possible key is nominated on the basis of whether or not a dominant motion is present in a chord progression. When it has been confirmed that the nominated possible key is also not inconsistent with the melody, the possible key is made confirmed key. First, in step S1, every register is initialized. More specifically, the following procedures are taken for the initialization purposes.

ROOT0 which is the first chord data in the chord memory is set into a root register RT provided for a chord in the current section (current chord). TYPE0 is set into a type register TP provided for the current chord, and "1" is set into a section number register n. Further, "FFH" (which is the maximum value of the hexadecimal number system and represents "undetermined") is set into a tonic register OTN provided for the key of a chord in the last section (last key) and into a mode (major/minor) register OMD provided for the last key. The section number n, which corresponds to the chord change order, is "1" at first and then increments its value one by one ("2", "3", . . . ) whenever a chord change occurs.

In subsequent steps S2 to S9, the following procedures are taken to determine a key in section n. First, the contents in the root register RT and type register RT (ROOT0, TYPE0) are copied into the root register ORT and type register OTP provided for the chord in the last section (last chord) (step S2). Next, the root ROOTn and type TYPEn of the chord in the current section are set into the registers Rt and TP for the current chord (step S3). Then, in view of the last chord, it is examined whether or not the progression or change to the current chord is a dominant motion (step S4). The dominant motion means a chord progression from the dominant seventh chord to the tonic chord. Namely, if the relation between the last and current chords corresponds to that between the dominant seventh and tonic chords, the chord progression is determined as being a dominant motion.

For this purpose, the following conditions are confirmed in step S4:

TP=Morm (the current chord is a triad of major or minor key),

OPT=7th (the last chord is a seventh chord), and (ORT+12−RT)=7 (the interval between the last and current chords is perfect five degrees (seven semitones).

If the above conditions are all satisfied, the transfer from the last chord to the current chord can be said to be a dominant motion.

When such a dominant motion is detected, the current chord is judged as a tonic chord, and therefore data indicative of this key is set into a provisional new key tonic register TN and a provisional key mode register MD, as a provisional new key (i.e., possible new key commencing in this section). In other words, root data of the current chord is set into the register TN as tonic data, and data indicative of the type (major/minor) of the current chord is set into the register MD as mode data. Further, on the basis of the melody in the section, it is confirmed whether the provisional new key is correct or not (step S6). Namely, the provisional new key is confirmed as being correct, if note which is among the scale notes of the last key identified by the data stored in a last key tonic register OTN and a last key mode register OMD but is among the scale notes of the provisional new key identified by the data stored in the provisional key registers TN and MD is contained among the melody notes in the current section. Once the provisional new key has been confirmed as being correct, various data TNLTY, MODE, TM are stored into the musical key memory 15 at such addresses designated by order data m (step S7); that is, the chord section number n is set as key change timing data TMm, the data in the register TN is set as tonic data TNLTYm, and the data in the register MD is set as major/minor data MODEm. In addition, the data in the provisional new key registers TN and MD are transferred to the last key registers OTN and OMD.

On the other hand, if the provisional new key has not been confirmed as being correct, it is considered that no key determination has been made this time, and so the last key (OTN and OMD) is set into the provisional registers TN and MD (step S8). In step S9, it is determined whether or not the section number n is now indicative of the last section (i.e., the end of automatic performance). If the determination result is "NO", the program goes to step S10. In step 10, the section number n is incremented, and the program goes back to step S2 to repeat the above-mentioned procedures.

The order data m for designating storage addresses in the musical key memory 15 is "1" (m=1) at first. Further, the last key registers OTN and OMD are initially set at an undetermined value FFH, and thus, when a first dominant motion is detected, the determination result in step S6 always becomes "YES" so that the program goes to step S7. Accordingly, when the first dominant motion is detected, the data TMm, TNLTYm and MODEm corresponding to m=1, i.e., TM, TNLTY and MODE are stored in step S7 into respective predetermined addresses (see FIG. 2C). In the case where the above-mentioned procedure has been done with respect to m=1, condition of m=0 is resumed, and the same data as TNLTY1 and MODE1 are stored into the memory as the first tonic data TNLTY0 and major/minor data MODE0 (FIG. 2C). This means that a key determined when the first dominant motion has been detected represents an original key of the music piece. Namely, TNLTY0=TNLTY1 and MODE0=-MODE1. After that, the order data m is incremented to m=2, so that when the procedure of step S7 is done next time, data TM2, TNLTY2 and MODE2 will be stored into respective predetermined addresses. Subsequently, the order number m increases one by one each time the program takes step S7. However, in many cases, the value of m remains very small since modulation, i.e., key transfer generally does not occur so often in one music piece.

In the embodiment described above, key determination is carried out by detecting a dominant section in connection with the chord progression and by examining the scale notes of provisional new key and last key in connection with the melody. Alternatively, the key determination may be performed taking other factors into consideration.

Figure 4:
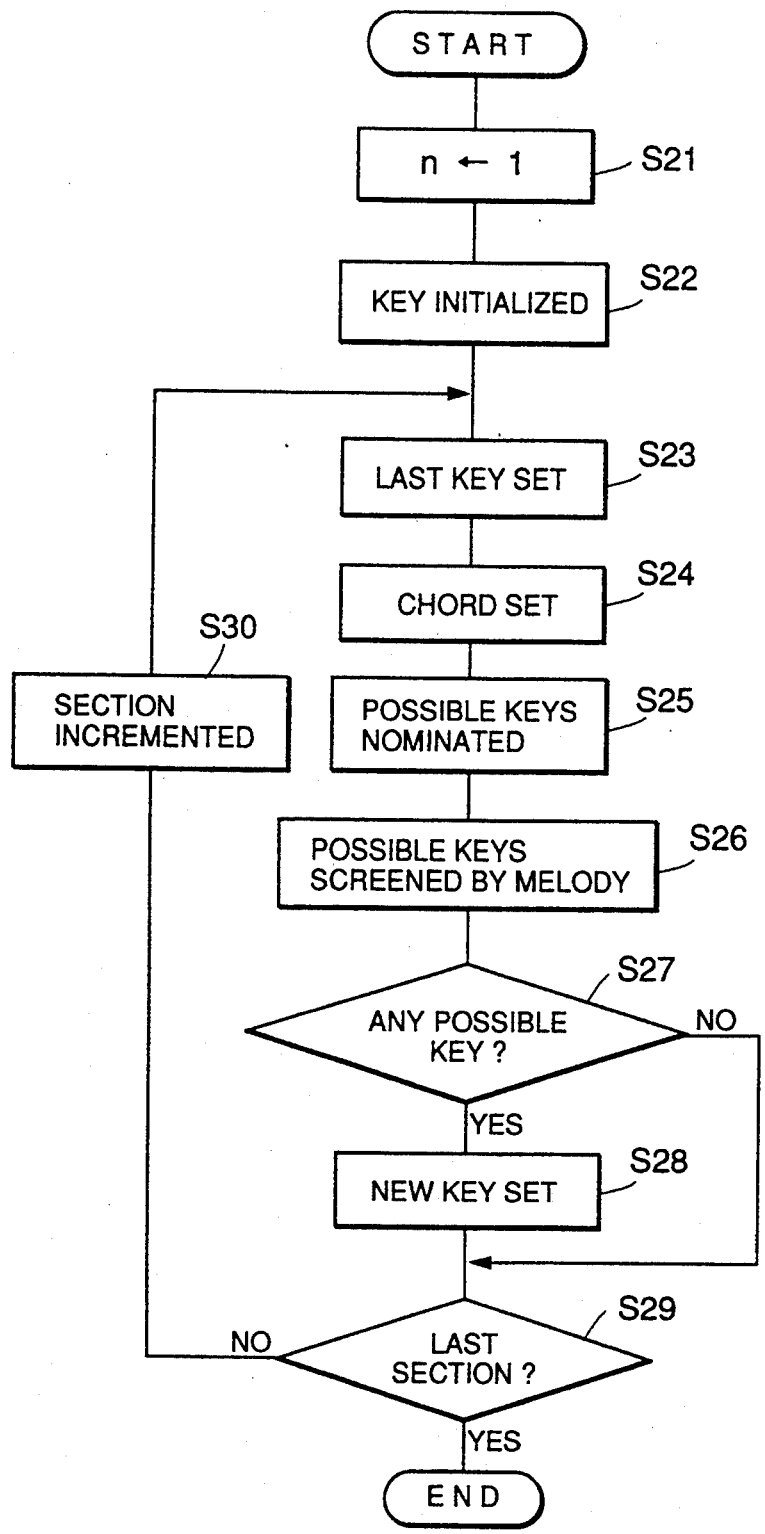
FIG. 4 is a flowchart illustrating another example of the key determining process.

FIG. 4 illustrates another embodiment of the key determining process. This process determines a key only on the basis of chord and melody of a section in question, without taking a chord progression into consideration. First, "1" is set as the section number n (step S21), and FFH (value indicating "undetermined") is set into tonic register TN and mode register MD for a key to be determined (step S22).

In subsequent steps S23 to S29, the following procedures are taken to determine a key in section n. First, the contents in the tonic register TN and mode register MD are set into tonic register ORN and mode register OMD for the key in the last section (last key) (step S23). Next, root data ROOTn and type TYPEn of the chord in the current section are set into the root register RT and type register TP (step S24). Then, a key having this chord as diatonic chords is nominated as a possible key (step S25). At the greatest, six keys will be nominated as this possible key. For example, C major chord cab be diatonic chords of C major key, F major key, G major key, A minor key, D minor key and E minor key, and thus these keys will be the possible keys. A final possible key is selected on the basis of those of the melody notes corresponding to the section n that are not among the scale notes of the last key but are among the scale notes of specific one of the nominated possible keys (step S26). If more than one possible keys are selected in step S26, then one specific key is determined as the final key on the basis of some priority order (for example, related keys) obtained from the last key, and its tonic and mode are written into the register TN and register MD, respectively (steps S27 and S28). The priority order may be stored in, for example, a table in advance. Subsequently, while incrementing the section number n, the above-mentioned steps S23 to S28 are repeated until the last section (steps S29 and S30).

The repetition of routine passing step S10 or step S30 may be effected at each of predetermined fixed clock timings or in synchronism with automatic performance timings.

Furthermore, although the foregoing embodiment has been described as determining keys by the use of memory-stored automatic performance data, the key determination may be made by inputting data which are obtained from real-time performance on a keyboard or other suitable input instruments.

What is claimed is:

1. A musical key determining device comprising:
   performance information supplying means for supplying melody information and chord information of a music piece;
   musical key nomination means for nominating one or more possible musical keys on the basis of the chord information supplied by said performance information supplying means; and
   key selection means for selecting from among the possible musical keys nominated by said musical key nomination means a musical key of the music piece on the basis of the melody information supplied by said performance information supplying means, said key selection means maintaining a previously selected musical key as the musical key if none of the nominated possible musical keys are selected.

2. A musical key determining device as defined in claim 1, wherein said key selection means selects from among the possible musical keys a single musical key that includes, among scale notes thereof, all of one or more notes corresponding to the melody information, and said key selection means determines if it is musically proper to select the single musical key as the musical key of the music piece.

3. A musical key determining device as defined in claim 2, wherein when the possible musical keys are nominated by said musical key nomination means on the basis of a certain chord progression from a first chord information to a second chord information, said key selection means selecting the single musical key on the basis of the melody information supplied in correspondence to a specific performance section which said second chord information covers.

4. A musical key determining device as defined in claim 3, wherein when the possible musical keys, any of which is not identical with a key having been selected so far, are nominated by said musical key nomination means, and when any of one or more notes corresponding to the melody information supplied in correspondence to nomination of the possible musical keys is not among scale notes of a previously selected first musical key but all notes corresponding to the melody information are among scale notes of a second musical key in the possible musical keys, said key selection means determines that the musical key of the music piece has changed and selects the second musical key as the musical key of the music piece.

5. A musical key determining device as defined in claim 4, wherein when the first musical key has not yet been formally selected, said key selection means selects the second musical key as an original musical key of the music piece.

6. A musical key determining device as defined in claim 1, wherein said musical key nomination means detects whether or not there is a dominant motion in a chord progression in accordance with a change in the supplied chord information and nominates a single possible musical key on the basis of a tonic chord of a detected dominant motion.

7. A musical key determining device as defined in claim 1, wherein said musical key nomination means nominates one or more possible musical keys which have diatonic chords as a chord corresponding to the chord information.

8. A musical key determining device as defined in claim 1, wherein said performance information supplying means includes a memory in which the melody and chord information are stored.

9. A musical key determining device as defined in claim 1, wherein said performance information supplying means includes performance input means for inputting the melody and chord information of a desired music piece on a real-time basis.

10. A method of selecting a musical key, the method comprising the steps of:
    supplying melody information of a music piece;
    supplying chord information of the music piece;
    nominating one or more possible musical keys on the basis of the supplied chord information;
    selecting from among the nominated possible musical keys a musical key of the music piece on the basis of the supplied melody information; and
    maintaining a previously selected musical key as the musical key if none of the nominated possible musical keys are selected.

11. A method according to claim 10, wherein the step of selecting further includes the steps of:

selecting a single musical key from among the possible musical keys that includes all of one or more scale notes corresponding to the supplied melody information; and determining if it is musically proper to select the single musical key as the musical key of the music piece.

12. A method according to claim 11, wherein the step of nominating possible musical keys is based on a certain chord progression from a first chord information to a second chord information, and wherein said step of selecting further includes selecting the single musical key on the basis of the melody information supplied in correspondence to a specific performance section which said second chord information covers.

13. A method according to claim 12, wherein when the nominated possible musical keys are not identical with a selected key, and when one or more notes corresponding to the melody information supplied in correspondence to nomination of the possible musical keys is not among scale notes of a previously selected first musical key, but instead all notes corresponding to the melody information are among scale notes of a second musical key in the possible musical keys, the step of selecting further includes determining that the musical key of the music piece has changed and selecting the second musical key as the musical key of the music piece.

14. A method according to claim 13, wherein when the first musical key has not yet been selected, the step of selecting further includes selecting the second musical key as an original musical key of the music piece.

15. A method according to claim 10, wherein the step of nominating possible musical keys includes the steps of:

detecting whether or not there is a dominant motion in a chord progression in accordance with change in the supplied chord information; and nominating a single possible musical key on the basis of a tonic chord of the detected dominant motion.

16. A method according to claim 10, wherein the step of nominating possible musical keys includes nominating one or more possible musical keys which have diatonic chords as a chord corresponding to the chord information.

17. A method according to claim 10, further including the step of storing the melody and the chord information.

18. A method according to claim 10, further including the step of inputting the melody and chord information of a desired music piece on a real-time basis.

* * * * *